UNITED STATES PATENT OFFICE

ALBERT K. EPSTEIN AND BENJAMIN R. HARRIS, OF CHICAGO, ILLINOIS

METHOD OF MANUFACTURING EGG NOODLES

No Drawing. Application filed September 5, 1929. Serial No. 390,658.

Our invention relates to egg products, and has to do also, with the incorporation of such egg products into alimentary pastes.

It is a well known fact that eggs in various forms and particularly yolk material, are used extensively in the manufacture of the type of food material generally referred to as alimentary pastes and includes such substances as noodles, pastries, etc. The egg material used is furnished to the baker or manufacturer either in wet or natural form in which the solid constituents are colloidally dispersed in a liquid medium; or in a dried condition, in which case they must again be brought into colloidal solution before they can be used satisfactorily. Now our invention contemplates improving the egg material used for these purposes either furnished in liquid or dried condition thereby producing a better final product and in many cases, a more economical product than has been possible heretofore.

The invention consists, in general, in employing a peptizing agent of a suitable character with the egg material which increases the colloidal dispersion of the protein constituents thereby securing a more fluid product requiring less additional water in the preparation of the paste and securing many other advantages which will be pointed out. The details of the invention differ somewhat depending upon whether a dried or liquid egg material is used, and for purposes of description, we shall consider each one of these types of substances separately. Assume first that liquid egg yolks are furnished for incorporation into alimentary paste. We take the commercially separated yolks, introduce a suitable peptizing agent, allowing sufficient time to elapse to give effect to the peptizing agent, and finally incorporate the egg material with other ingredients such as flour, water, etc., to form a paste. We also may freeze the egg material below the temperature of decomposition and maintain the mixture frozen until ready for use. At this time, it may be thawed out for a sufficient length of time at normal temperature to acquire the necessary fluidity and then use the other ingredients in the usual manner to prepare the paste.

As the type of substance employed for peptizing purposes we may use a neutral salt, such as sodium chloride; a soluble carbohydrate, such as dextrose or cane sugar; or a combination of these peptizing agents with relatively smaller proportions of edible acid, such as tartaric, citric or malic, usually in proportions less than .14%, based on the finished product.

When employing the acid, enough should be used to increase the colloidal properties of the product, but care should be taken, of course, to avoid the use of proportions large enough to cause coagulation of the egg substance. In come cases, as little as .1% is sufficient, in other cases, slightly larger proportions are used. While the use of such agents as these without cooling or freezing is very beneficial, we find that refrigerating or freezing usually have a very good effect in increasing the keeping qualities of the product for longer periods of time, such as six to twelve months, depending upon the temperature of storage.

A relatively large amount of dried egg substance, either dried whole eggs or dried yolks, is employed in the industry and the dried product must, of necessity, be redissolved before it can be used satisfactorily for emulsification of oils for baking and paste purposes.

In accordance with our invention, we mix a suitable peptizing agent of the type described in the preceding paragraph such as sodium chloride for example, in sufficient quantities, with the dried egg substance and the resulting mixture is then dissolved in an aqueous liquid such as water and when fully dispersed is adapted for use in the preparation of the paste. Instead of employing it immediately, however, it can be frozen below the temperature of decomposition and maintained in a frozen state in exactly the same way as the undried egg product. For the benefit of those skilled in the art, we shall refer to some of the details and features in the preparation and use of the dried egg product.

One form of the process consists in taking one hundred pounds of dried egg yolk material and adding thereto ten pounds of common table salt, mixing it thoroughly and storing it until ready for use, at which time a suitable amount of water may be added thereto depending upon the use to which the product is to be put.

In order to explain the advantages of our invention and still further to clarify the features of the same, we shall refer to the manufacture of egg noodles. In the manufacture of this product eggs, water and a specially prepared flour are used. The materials are mixed together to form a paste, the paste is formed into narrow strips and the strips allowed to dry at approximately 100 degrees Fahrenheit until all excess moisture has been driven off. The finished product should contain not more than 8% to 12% moisture, because if the moisture contained is too high, the product will not keep well, generally getting mouldy in a relatively short time. In the old process, a relatively large amount of water had to be used in order to incorporate it thoroughly and the drying time was from sixteen to thirty hours, depending upon atmospheric conditions. The floor space required in the drying process is quite great and consequently a large area was tied up and manufacturing costs necessarily high.

Now in our process by reason of the greater fluidity of the eggs, we can thoroughly mix the noodle paste with considerably less water and the drying time is cut down proportionately, the exact time depending, of course, on weather conditions, etc.

A concrete example of the manufacture of noodles is as follows: 200 pounds of specially prepared flour are placed in a mechanical mixer with 30 pounds of egg yolk containing 10% sodium chloride, which has been allowed to peptize at room temperature with 4¾ gallons of water. The mixture is stirred and kneaded at high speed for about twenty minutes to form a stiff dough and is then rolled into thin sheets and cut into narrow strips and dried.

The process has very great advantages when employed with dried egg material. Heretofore, when the dried yolks were employed for noodles, the dried yolk was soaked in water for a considerable length of time at room temperature, the soaking designed to completely disperse the protein material in the water. This simple expedient did not accomplish a satisfactory dispersion of the protein material because even after long periods of soaking a thoroughly dispersed product was not obtained. Probably the reason is that some of the properties of the eggs become so altered during the drying as to make it difficult by simply soaking to reverse the process and re-establish the colloidal dispersion. The necessary time of soaking also afforded an opportunity for enzymes and organisms which are present in the material to act upon the protein and other constituents of the dry egg, thus changing their colloidal properties and producing an offensive odor due to decomposition.

In our process the forming of the colloidal solution is in the presence of a peptizing agent such as sodium chloride which accelerates the process bringing about substantially complete dispersion before any organisms present have had a very great opportunity to multiply. The peptizing agent used generally will be found to be slightly bactericidal and will also have a beneficial effect. The product will be more fluid due to the peptized condition of the solid constituents and a higher concentration of the yolk solids may be obtained in a better dispersion by utilizing less water than when dried eggs are dissolved direct in the water.

In general, natural yolk contains about 51% moisture and 49% of solid, or the ratio of moisture to solids is approximately 1-1. Commercially separated yolk contains more moisture. Now, in preparing the peptized egg product from dried egg yolks, 100 pounds of dried yolks can be mixed dry with 10 pounds of salt and this mixture compounded with 100 pounds of water and allowed to stand for sufficient length of time at ordinary temperatures to peptize. The product finally obtained would have the same solid concentration as the liquid yolks, but would be considerably more fluid, requiring less water in the manufacture of a paste, such as used in noodle making.

If a high solid concentration is desired, a smaller amount of water can be used and allowed to peptize with the salt and the resulting product will still have substantially more fluidity than natural liquid egg yolks which contain considerably more moisture and which have been frozen and then thawed.

In any event, independent of the proportions used, a more hygienic product will be obtained and greater dispersion of the colloidal constituents result. The final paste product can be manufactured more economically due to the saving in time and space and a better product will also be produced.

We do not limit ourselves to any process requiring the immediate use of the egg product at any step in its manufacture. The dried egg product using a peptizing agent incorporated therewith is a new article of commerce without our experience.

This dried egg product, including the yolk and peptizing agent, can be processed with an aqueous liquid until the yolk material is sufficiently dispersed and immediately incorporated into a paste, or it can be liquified by the addition of water and refrigerated below temperatures of decomposition or frozen to low temperatures, whereby subsequent thawing and keeping in thawed condition will produce a product still further modified and possessing more uniformity and homogeneity than a dried yolk product dissolved in water without a peptizing agent, frozen and thawed.

One of the products of our invention having considerable utility is a concentrated egg yolk product peptized with sodium chloride or other suitable agents, frozen to a very low temperature to still further modify the colloidal properties and to secure other modifications whereby the final thawed product will have a solid concentration greatly in excess of that of natural fresh egg yolks or commercially separated yolks, but will possess as great or greater fluidity under the same conditions. For these reasons, we do not restrict ourselves to any of the details of the invention set forth herein, but such invention is limited only by the scope of the appended claims.

What we claim is new and desire to protect by Letters Patent of the United States is:

1. The method of manufacturing egg noodles which comprises rendering egg material more fluid than normal egg yolk by means of a peptizing agent, mixing together said fluid egg material with flour material and a relatively small amount of water to produce a plastic paste, forming the paste into proper shape, and finally drying the shaped paste, the step of rendering the egg material more fluid having the effect of decreasing the amount of water required in the paste, whereby the drying time is reduced.

2. The method of manufacturing egg noodles which comprises peptizing egg material with salt to render the same more fluid, adding water thereto, incorporating flour material with the fluid egg material to form a stiff paste, forming the paste to noodle shape, and drying the needles, the peptizing of the egg material decreasing the amount of water used in the paste, whereby the drying period is decreased.

In witness whereof, we hereunto subscribe our names this 1st day of August, 1929.

ALBERT K. EPSTEIN.
BENJAMIN R. HARRIS.